(12) United States Patent
Ni et al.

(10) Patent No.: US 6,822,585 B1
(45) Date of Patent: Nov. 23, 2004

(54) INPUT OF SYMBOLS

(75) Inventors: Jian Ni, Beijing (CN); Yong Gou, Oulu (FI); Ninghui Gao, Beijing (CN)

(73) Assignee: Nokia Mobile Phones, Ltd., Espoo (FI)

( * ) Notice: Subject to any disclaimer, the term of this patent is extended or adjusted under 35 U.S.C. 154(b) by 353 days.

(21) Appl. No.: 09/663,666

(22) Filed: Sep. 15, 2000

(30) Foreign Application Priority Data

Sep. 17, 1999 (FI) .............................................. 19991989

(51) Int. Cl.$^7$ .............................................. G09G 5/40
(52) U.S. Cl. ......................... 341/28; 341/22; 345/171; 379/368
(58) Field of Search ................................ 345/171, 156; 341/28, 22; 379/368; 400/109, 110, 489, 111

(56) References Cited

U.S. PATENT DOCUMENTS

| | | | |
|---|---|---|---|
| 5,128,672 A | * 7/1992 | Kaehler | 341/23 |
| 5,786,776 A | * 7/1998 | Kisaichi et al. | 341/23 |
| 5,797,098 A | * 8/1998 | Schroeder et al. | 455/464 |
| 5,945,928 A | * 8/1999 | Kushler et al. | 341/28 |
| 5,952,942 A | * 9/1999 | Balakrishnan et al. | 341/20 |
| 6,005,498 A | * 12/1999 | Yang et al. | 341/23 |
| 6,054,941 A | * 4/2000 | Chen | 341/28 |
| 6,219,731 B1 | * 4/2001 | Gutowitz | 710/67 |

FOREIGN PATENT DOCUMENTS

| | | |
|---|---|---|
| EP | 0930760 A2 | 7/1999 |
| GB | 2333386 A | 7/1999 |
| WO | WO 98/33111 | 7/1998 |
| WO | WO 00/34880 | 6/2000 |

\* cited by examiner

Primary Examiner—Michael Horabik
Assistant Examiner—Hung Dang
(74) Attorney, Agent, or Firm—Perman & Green, LLP

(57) ABSTRACT

A mobile phone has a display and a keypad which comprises a plurality of keys. Each key has associated with it a plurality of different symbols. The keypad is used to enter symbols in the form of Pinyin strings (25) into the display which are then used to determine a candidate list (26) of Chinese characters which are presented in the display. Symbols are entered into the display by pressing respective keys once or more than one times in rapid succession. Selection of a symbol is only permitted if it corresponds to a valid Pinyin string (25), either in isolation or in combination with one or more symbols entered in a previous selection. Characters chosen from the candidate list are entered into a message (24) in the display.

22 Claims, 4 Drawing Sheets

INPUT OF SYMBOLS

FIELD OF THE INVENTION

The invention relates to inputting symbols from a keyboard or a keypad and is particularly, but not exclusively, related to inputting symbols which are not part of the Latin alphabet. In one embodiment the invention is used in the input of characters from character-based languages, such as Chinese hanzi characters and Japanese kanji characters.

BACKGROUND OF THE INVENTION

Using a keyboard to input characters (also referred to as ideograms) from character-based languages such as Chinese has presented difficulties for some time. There are more than 20 000 Chinese characters and of them about 5 000 to 12 000 are currently commonly used. Therefore, it is not practical to provide a keyboard having a one-to-one correspondence between individual keys and individual characters.

In current methods of inputting Chinese characters into electronic devices having a keyboard (for example a computer), it is known to employ indirect input by describing characteristics of a Chinese character and then selecting a particular Chinese character prompted in a candidate list which is presented to a user. This prompting is performed by software specially written for input of ideogram characters which is referred to as a Front End Processor (FEP) or an Input Method Editor (IME). An FEP interprets an input string from the user and prompts to the user a candidate list of the Chinese character(s) which match the input string or description. The user can then select the correct candidate (if it is shown) from the list and it is entered into a display as the selected character. The candidate can be more than one character. It may be a phrase.

Different ways of describing characters provide the bases of different Chinese input methods. Characters are either described phonetically in which Chinese characters are inputted by describing the associated pronunciation or they are described in terms of character shape in which Chinese characters are inputted by describing the graphical construction or shape of the character. In the People's Republic of China, the method used to describe pronunciation is Pinyin, which literally means "spelling the pronunciation". This is a phonetic representation of Chinese characters by a Latin alphabet in conjunction with accent marks. Another phonetic description approach is Zhuyin (Bopomofo). This is a phonetic representation of Chinese characters by 37 specific Bopomofo symbols and tone marks.

Because most of the existing Chinese input methods were originally designed for PC keyboards, the number of the basic input symbols or input codes normally matches the number of keys present on a standard QWERTY format keyboard. The table below gives the number of keys required for some of the more popular Chinese input methods.

| Input method | Description | Number of keys required |
| --- | --- | --- |
| Pinyin | Pronunciation | 26 + 4 (for tones) |
| Wubizixin | Character shape | 25 |
| Bopomofo | Pronunciation | 37 + 5 (for tones) |
| Changjei | Character shape | 25 |
| Simple five stroke | Character shape | 5 |

If a character input method requires more basic input symbols than there are number of keys on a keypad, the first step of inputting the description will encounter a bottleneck. This is caused by more than one symbol being associated with one key which results in repeat or multiple keystrokes being required to input particular symbols.

The problems presented by keyboard input of characters are particularly acute in relation to inputting characters into mobile communication terminals such as mobile phones. This is because of the restricted number of keys (often less than twenty) present in the keypads of such terminals. Since the number of symbols required is often greater than twenty, this can cause the bottleneck described above. Furthermore, since the displays of such terminal are usually small, this can present further difficulties, especially if there needs to be interaction between the terminal and a user of the terminal during the input of symbols and characters.

In the table above, the simple five stroke method is referred to. A stroke is the smallest graphic element to construct a Chinese character and is a complete stroke by a writing tool without lifting it from a writing surface. There are five basic strokes. In the case of a mobile phone, the simple five stroke input method is the one whose input codes can be easily mapped to a phone keypad. However, it is the slowest method to use.

Pinyin is a popular method for inputting Chinese characters into electronic devices because it uses symbols from the Latin alphabet to describe the characters and there are only 413 pronunciations (without using tone marks) for the 6763 commonly used characters in the national standard of the People's Republic of China, GB2312-80. This means Pinyin has only 413 words in its vocabulary which need to be described.

An example of Pinyin will now be given. If a user wants to input the characters meaning "middle" or "centre", he uses letters or symbols from the Latin alphabet to enter the Pinyin pronunciation "zhong". The FEP receives this input string and identifies a number of characters which have this pronounciation. These characters or candidates are presented to the user in the from of a candidate list. The Latin letters input by the user and the candidate list are shown in FIG. 1 which represents part of a user interface. This represents a typical situation in which there is more than one candidate available for a given input string. The average number of candidates matching a given input string of an input method is called the Input Coding Redundancy Rate (ICRR). The higher the ICRR, the longer the candidate list a user will receive for an input string, and so the greater number of candidates the user has to scroll through in order to find the correct character. High ICRRs slow down the speed at which characters can be input.

Phone keypads generally have a key layout corresponding to that shown in FIG. 2. A set of symbols (or an alphabet) is assigned (or mapped) to most or all of the keys. For any particular key its alphabet of assigned symbols forms a queue or loop. Within a predefined time-out period, a user presses the key an appropriate number of times sequentially to select a desired symbol in the alphabet. The symbol is then indicated in a display. The symbol is entered into the display if the time-out period expires or if a different key is pressed.

It is time-consuming to input strings of symbols into mobile phones and so methods have been developed to reduce the number of keystrokes that are required. In a method commonly known as T9 provided by Tegic Communications, Inc., input occurs as "one alphabet one key stroke". A user identifies the key on which a desired symbol is present and presses that key once. A particular alphabet of three or four symbols is typically associated with that key. This method has been adapted to use the Pinyin system to input Chinese characters. An example will now be given. If a user wants to input the Pinyin string "gao", he needs to press the keys 4, 2, 6 on the keypad. The method identifies the Pinyin strings which are permissible and can be formed by the alphabets from keystrokes 4, 2, 6 and displays all of them to the user. In this example the permissible Pinyin strings are "gan", "gao", "han", and "hao". All characters which match the permissible Pinyin strings are then indicated as candidates.

A disadvantage of T9 is that a long candidate list is often generated for a given input. This problem becomes worse as the input string becomes shorter. For Chinese input, T9 presents a list of all Chinese characters as candidates if they match any of the possible combinations for the keys which have been pressed. For example, if keys 7 and 4 are pressed, all characters with Pinyin of "pi", "qi", "ri", "si" are indicated, which makes a very long candidate list.

T9 has other disadvantages. It does not give clear feedback in response to user input. This is usually desirable in Chinese input because it is an interactive process in which the user should be able to correct input according to the displayed candidate list. Although T9 tackles the problem of duplicate keystrokes for Pinyin input, it does this at the cost of a long candidate list, and thus a higher ICRR. This means that a user often has to scroll through a long candidate list to find a desired Chinese character. This disadvantage is a particular problem with mobile phones because a small display limits the number of candidates which can be displayed at one time.

T9 has also been applied to Bopomofo input in which the 37 Bopomofo symbols are assigned or mapped to the keys of phone keypad. Besides having similar problems to those discussed above in relation to Pinyin, there is a further problem in that the Bopomofo keypad mapping is totally random from the point of view of a user. The user has no easy way of knowing where each Bopomofo symbol is located, especially if they are not all printed on the keypad due to restrictions in space.

Another method used in the input of Chinese characters uses context sensitive input that predicts the next Chinese character according to the context and a Chinese word database. In this approach, analysis is carried out at the level of the Chinese (ideogram) characters and not at the level of input symbols. This approach can be illustrated by the following example. The example is given in English simply for the purposes of explanation.

A user wants to input the text "read book". After the user has inputted the word "read", the software prompts words which are likely to follow "read", for example "book" or "newspaper". If the correct word is indicated, it may be chosen by a user.

A method of inputting symbols and characters is disclosed in GB 2 333 386. A terminal is provided with a probability table which gives a list of the most probable Latin symbols which follow each of the 26 Latin symbols and the "space" symbol. During input of text, on inputting a Latin symbol, a user is presented with a list of all of the Latin symbols in an order determined by the probability of being the next symbol rather than being in a default, for example alphabetical, order. A problem with this method is that the user is presented with a long list of symbols from which to choose a particular symbol.

It is clearly desirable to provide an effective method for inputting characters. Such a method should be easy to learn and to use, it should have a low ICRR and it should have a short average input code length per character. Unfortunately, the above requirements often conflict with each other and it is difficult to provide a character input method which is optimised for all factors.

SUMMARY OF THE INVENTION

According to a first aspect of the invention there is provided a method of inputting characters into a terminal the terminal having a plurality of keys at least one of the keys representing a plurality of different symbols in which use of a key to make a previous selection of a symbol is used to determine those symbols represented by a key which are selectable in a subsequent selection.

The term "symbol" includes any graphic glyph which can be inputted directly from a keyboard or a keypad. Symbols include alphabets, digits, and basic character input elements such as Bopomofo symbols, character strokes and tone marks. Symbols can be inputted directly from a keyboard and do not require an FEP. Characters, for example hanzi and kanji, need to be input via an FEP.

Preferably a number of the keys have associated with them an alphabet of different symbols which can be accessed and indicated in a display by means of single or multiple key selections or key presses of the keys. The previous selection may result in the alphabet or alphabets of symbols for one or more of the keys being limited.

The key used in the previous selection may be the same key as the key used for the subsequent selection. Alternatively, the keys may be different. The symbols in the previous and subsequent selections may be the same or may be different.

Preferably the method is used to input ideogram characters. It may be used to input Chinese characters (hanzi). Alternatively it may be used to input other characters such as those used in Japan (kanji), Korea or elsewhere. The method is not restricted only to the input of characters and may be used to input letters to form words in the Latin alphabet. According to a second aspect of the invention there is provided a user interface for inputting characters into a terminal the terminal having a plurality of keys at least one of the keys representing a plurality of different symbols in which a symbol is selectable by using a key to make a first selection and a processor is used to determine those symbols represented by a key which are selectable in a second subsequent selection.

According to a third aspect of the invention there is provided a terminal for receiving input of characters the terminal comprising a processor and a plurality of keys at least one of the keys representing a plurality of different symbols in which a symbol is selectable by using a key to make a first selection and the processor is used to determine those symbols represented by a key which are selectable in a second subsequent selection.

Preferably the terminal is a mobile terminal. It may be a mobile phone, a smart phone, a personal digital assistant, a laptop, an electronic notepad, a pager or some other terminal which accepts input from a plurality of keys. In an embodiment in which it is a mobile phone, it may be a cellular mobile phone for connection to a cellular telephone network.

The invention is particularly suitable for terminals which have a small keypad. In this context small means that some of the keys of the keypad have associated with them more than one symbol. This may be less than twenty keys and in certain embodiments may be about twelve keys which are used for, and may be dedicated to, the input of symbols.

In the invention, all the elements which have already been inputted by the user are assumed to be correct and fixed unless the user chooses deliberately to amend them. It only predicts the next symbol which can appear. It is forward-prediction and does not change input which has already been inputted.

Compared to the T9 method, the invention may slightly increase the number of keystrokes required for inputting symbols. However, to compensate, the invention provides a smaller IRCC than T9 and so the number of keystrokes required in total to find a particular Chinese character is reduced. The candidate list may be reduced by an amount in the region of 50%. This provides a significant advantage to devices having a small display because it is rather difficult and slow to scroll through the candidate list in such device. If a single scroll step up or down is considered to be a keystroke, this invention may require fewer keystrokes than the T9 method. In addition, the invention provides positive feedback to the user to guide the input or provide an indication of errors.

BRIEF DESCRIPTION OF THE DRAWINGS

The invention will be described by way of example only with reference to the accompanying drawings in which.

DETAILED DESCRIPTION

Figure 1:
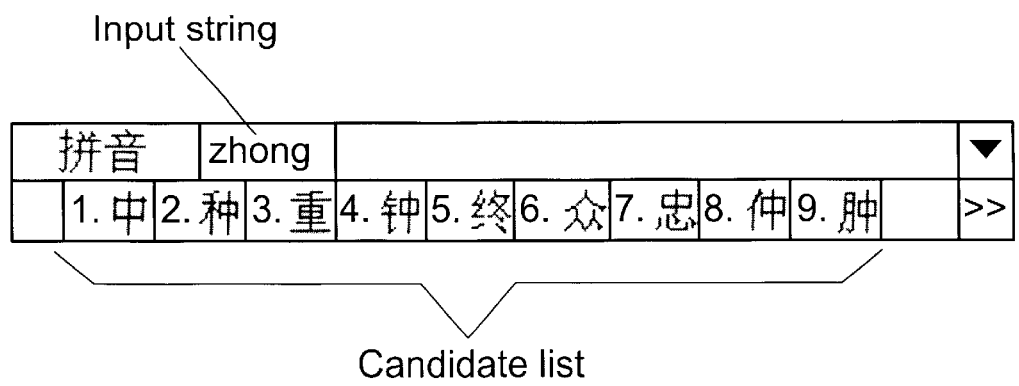
FIG. 1 shows input and a response presented by a display.
Figure 2:
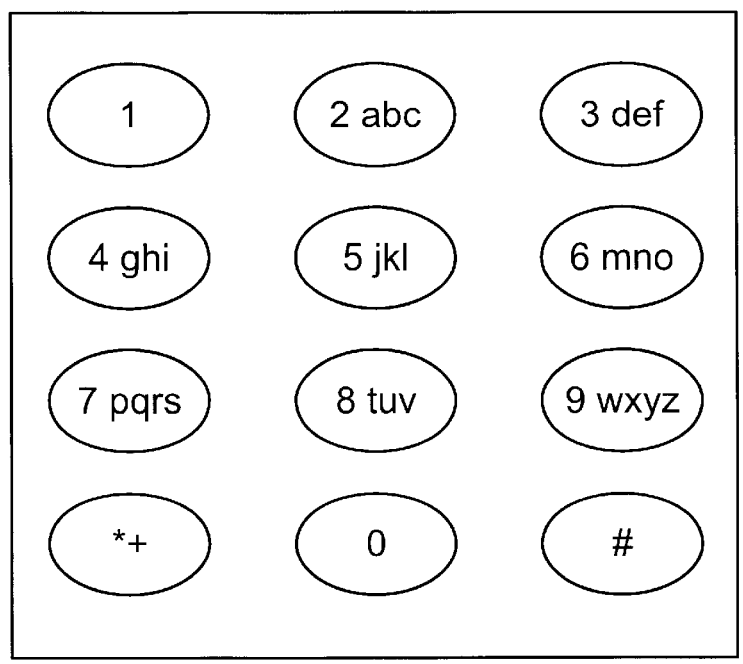
FIG. 2 shows a layout of a phone keypad.

FIGS. 1 and 2 have been discussed in the foregoing.

Figure 3:
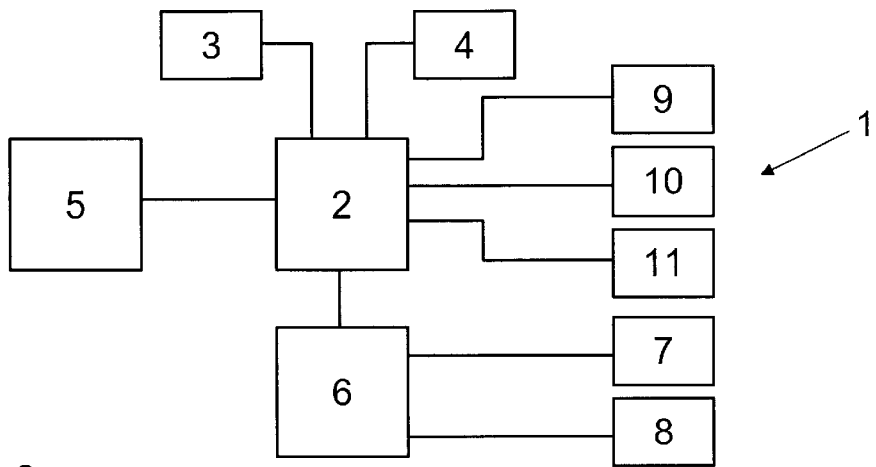
FIG. 3 shows a mobile terminal.

FIG. 3 shows in schematic form functional hardware blocks of a terminal. In this particular embodiment the terminal is a mobile telephone 1. The hardware blocks are controlled by a controller 2 which runs an operating system. Various software, applications and data are stored in random access memory (RAM) 3 and read only memory (ROM) 4. The telephone receives and transmits through a transceiver block 5. Operations concerned with handling speech occur in an audio part 6 which is linked to an earpiece 7 and a microphone 8. Other features such as a subscriber identity module (SIM) card 9, display 10 and keypad 11 are also controlled by the controller 2. The FEP is implemented in software and is in contained in the RAM 3 and/or ROM 4. Instructions provided by the software are run by the controller 2 to control the display 9 and the keypad 10.

Figure 4:
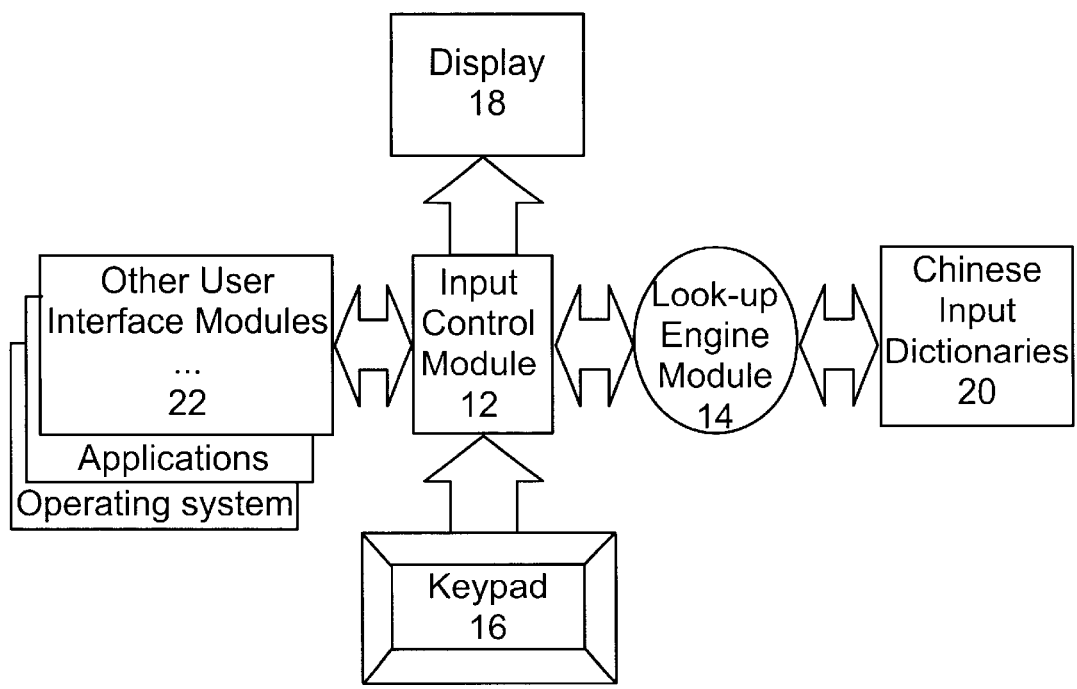
FIG. 4 shows a system architecture of the terminal of FIG. 3.

FIG. 4 shows a system architecture of the terminal of FIG. 3 and indicates those parts concerned with input of symbols and characters and particularly those parts which comprise the FEP of the terminal. The system architecture can be divided into four modules, an input control module 12, an engine look-up module 14, a keypad input unit 16 for allowing input into the input control module 12 and an output unit such as display 18. In addition to these four modules, the engine look-up module 14 is connected to a Chinese input dictionary 20 which contains a mapping table of Pinyin strings and matching Chinese characters. The engine look-up module can use the Chinese input dictionary to retrieve Chinese characters from a given Pinyin string. In the case of a Chinese dictionary it contains a list of all of the possible Pinyin strings.

In this embodiment, the FEP comprises those parts which are used to process the input operations which take place when Chinese characters are inputted, that is the input control module 12, the engine look-up module 14, and the Chinese input dictionary 20. The terminal comprises other interface modules, an operating system and applications 22. The other interface modules are used to control an interface between the user and the terminal for other operations, such as those related to telephony. The operating system and applications are used to control operation of the FEP and other parts of the terminal, such as those related to telephony.

Before any symbols have been entered into the display of the terminal, any symbol which can be a valid opening symbol of a Pinyin string may be selected from the keypad and entered into the display. The symbols u, v, and i cannot be used as the leading character of a Pinyin string. The terminal is configured so that following input of the opening symbol, when a subsequent key is pressed, only the symbols that can make a valid Pinyin combination with the opening symbol are made to be selectable by a user. Therefore, at least some of the alphabets associated with the keys on the keypad may be limited so that not all of their symbols are available to the user. When the user presses the subsequent key, the available symbols from the selected alphabet are prompted to user one by one. In effect, the input method predicts the next possible alphabet so that those symbols which cannot form valid Pinyin strings are not made to be selectable.

In one embodiment, the decision regarding the determination of which symbols are selectable from the keypad is made in the engine look-up module 14. In this case, the engine look-up module 14 knows which symbols are mapped to which keys in the keypad. Therefore, the input control module 12 simply passes on details of which keys have been pressed to the engine look-up module 14. For example if the string "ga" has been entered in the display, then on a user pressing key "6" having symbols "m", "n" and "o" associated with it, the input control module 12 informs the engine look-up module 14 that this key has been pressed and the engine look-up module 14 checks in the Chinese input dictionary 20 to see if the available choices of Pinyin strings "gam", "gan" and "gao" are valid. On finding the first valid string, in this case "gan" the engine look-up module 14 notifies the input control module 12 to indicate symbol "n" in the display.

In the present embodiment, the decision regarding the determination of which symbols are selectable from the keypad in made in the input control module 12. Using the example above of "ga" followed by key press "6", the input control module 12 sends the string "gam" to the engine look-up module 14 to check if it is valid. It is not a valid string and so the engine look-up module 14 sends a response to the input control module 12 to this effect. The input control module then sends the next string "gan". This is a valid string and so the engine look-up module 14 informs the input control module 12 of this and "n" is indicated in the display after the string "ga" which had already been entered.

It may be that the user actually wants to enter the string "gao" in which case he would press the "6" key again which results in the input control module 12 sending to the engine look-up module 14 the string "gao". Since this is also an acceptable string, the input control module is notified and "o" is indicated in the display instead of "n".

Each of these embodiments does not cause significant additional memory consumption or computing overhead compared to a normal Chinese input method.

Figure 5:
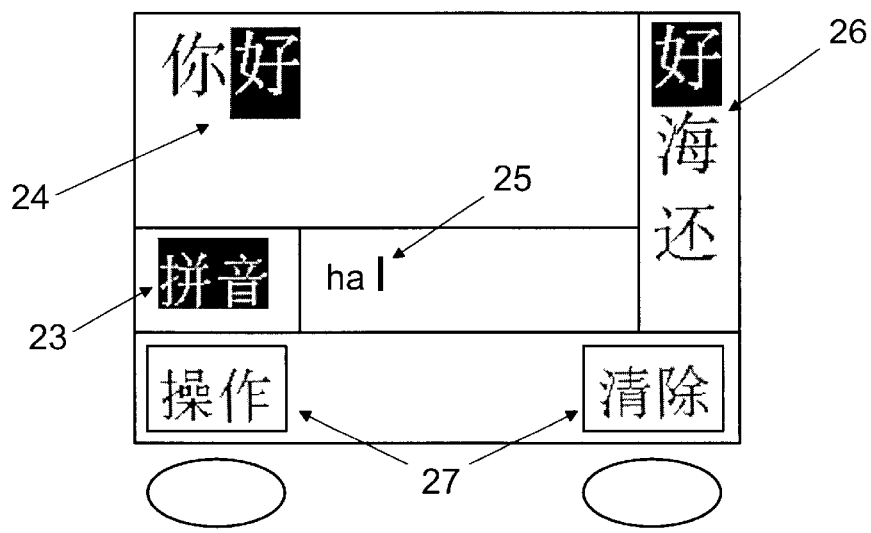
FIG. 5 shows a display of the terminal.

FIG. 5 shows a Chinese input display according to the invention. It shows different areas of the display and their contents during editing of a Chinese short message. The display areas are an input status indicator 23 which shows the current input status, an editing window 24 in which user texts are displayed and edited, an input window 25 in which input strings such as Pinyin are displayed and edited, a candidate window 26 in which candidates matching the input string are displayed and a window for displaying text 27 related to function keys. The window 27 defines the function of two keys located immediately below the texts. The user is able to scroll through candidates in the candidate window 26 in order to highlight a candidate prior to its selection and entry in the display.

Figure 6:
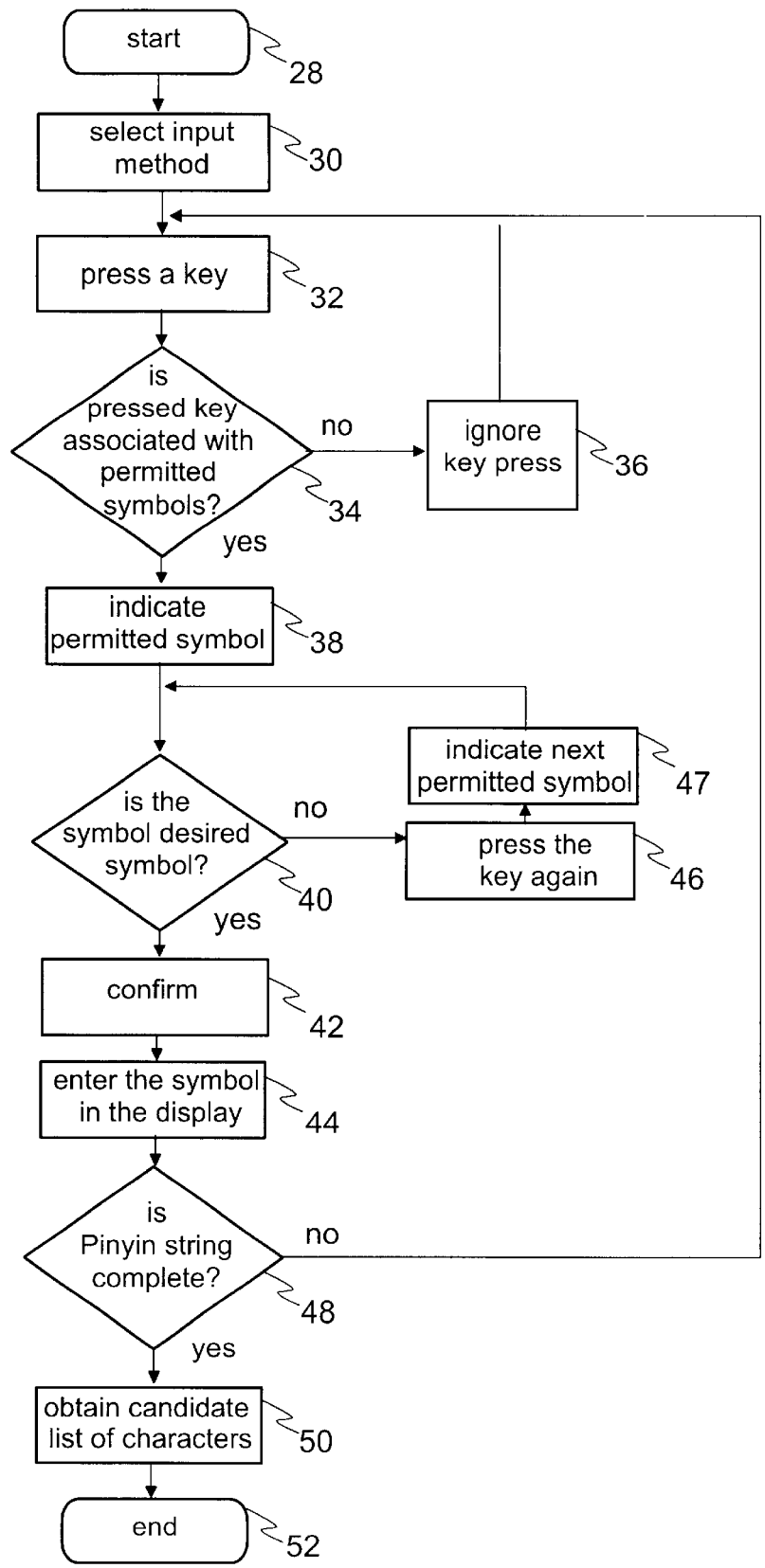
FIG. 6 shows a flowchart of forward-predictive Chinese input.

Input of symbols and characters is shown in FIG. 6 in the form of a flowchart. The operation starts at initial step 28. In step 30 a user uses the input control module 12 to select an input method to input characters. For example, this may be the input of Chinese using the Pinyin method. Once the input method is active, in a step 32 the user presses a key containing a desired symbol which is the opening symbol of a desired Pinyin string. The engine look-up module 14 uses the Chinese input dictionary 20 to determine in step 34 whether the pressed key is associated with any permitted symbols. If the pressed key is not associated with any permitted symbols, then in step 36 the key press is ignored and no symbol is indicated in the display 18 of the terminal. In this event the terminal waits for the user to press another key. If the pressed symbol is associated with a permitted symbol, in step 38 the first of the permitted symbols associated with the key is indicated in the display. Of course, if only one permitted symbol is associated with the pressed key, it is indicated in the display. From the time when the first symbol is indicated in the display, that is when an entered symbol can form (part of) a valid Pinyin string, the candidate list is presented in the display. Thus the candidate list may be displayed even before the user confirms that a symbol indicated in the display is to be entered in the display. This saves time in that the user can choose a character from the character list without having to wait for time-out or to press another key to enter the symbol. In the flowchart, the candidates are displayed from the point at which symbols are indicated in the display in step 38. Thus the user receives instant feedback of his input from the candidate list. The user looks at the indicated symbol in the display and in a step 40 decides whether the indicated symbol is the desired symbol. If it is, then the user confirms this fact in a step 42 either by waiting for a time-out period associated with the selection of the symbol to expire or by pressing an appropriate selection key on the keypad input unit 16. The selection key may either be a key which is particularly assigned to the task of confirming selection or may simply be another key for inputting a symbol. In step 44, the terminal then enters the symbol in the display as a chosen symbol. If the indicated symbol is not the desired symbol, then in step 46 the user presses the key again to display the next permitted symbol (step 47) and to check again if the indicated symbol is the desired symbol. It should be remembered that the engine look-up module 14 uses the Chinese input dictionary 20 to allow selection of only those symbols which make valid Pinyin strings. Therefore, the user cannot select symbols which are not permitted. If the user tries to find a symbol but is unable to, this can act as a prompt that something is wrong, for example the spelling of the Pinyin string. In this way the terminal provides feedback to the user. It should be noted that this feedback is provided during the formation of the Pinyin string and not after input of all symbols to represent the Pinyin string has been completed. This is in contrast to the T9 method. Once a symbol has been entered into the display 18, the user checks in step 48 if the Pinyin string is complete. If it is not, then the user presses another key in a step 32 to select another symbol and the procedure of symbol selection is repeated. The FEP of the terminal is used in step 50 to obtain a candidate list of characters from the completed Pinyin string. Although the complete Pinyin string can be entered before a character is chosen from the candidate list, as discussed above, the user can choose a character at any time from when it is first displayed in step 38. The operation finishes at final step 52.

In step 42, if a symbol is selected and entered into the display by pressing another key to cause another symbol selection procedure to begin, this causes the procedure to re-start at step 34, that is the engine look-up module 14 checks if the pressed key has associated with it any permitted symbols.

In addition to the steps described above, steps are also provided to allow for deletion of symbols or characters in the event of a change being required. This may be as a result of a spelling mistake in the symbols in the string which have been entered or as a result of a change in mind of the part of the user. Such correction procedures in terminal user interfaces are well known to persons skilled in the art and any known method may be employed.

The sequence of commands and notifications which occur between the input control module 12, the engine look-up module 14 and the Chinese input dictionary 20 is described below:

1. The user presses a key. In this case the key "2" is pressed.

2. The keypad accepts the keystroke event. The keypad then sends the event to the input control module 12. In this case the event is that key "2" has been pressed 3. The input control module 12 adds a new input symbol into its input buffer according to the assigned symbol sequence of the pressed key. In this case symbol "a" is added to the buffer.

4. The input control module passes the input string to the engine look-up module 14 and asks for the number of candidates which match the input string.

5. The engine look-up module 14 checks the input string from the input buffer in the Chinese input dictionary 20 and returns the number of matching candidates to the input control module 12. In this case the string "a" from the input buffer is checked in the Chinese input dictionary 20.

6. The input control module 12 checks the number of matching candidates. In the case of "a", the number is greater than zero which indicates that there are candidates which match the input string. The input control module 12 requests the candidates from the engine look-up module 14.

7. The engine look-up module 14 refers to the Chinese input dictionary 20 to get the corresponding candidates and then passes them to the input control module 12.

8. The input control module 12 displays the input string and its associated candidates on the display of the terminal. In this case the input string "a" and its candidates are displayed.

9. The user makes the next key press. In this case the key "4" is pressed.

10. The keystroke event is accepted, that is that key "4" has been pressed. The keypad then sends the event to the input control module 14. Steps 3 to 5 are repeated. The input string now becomes "ag".

11. The input control module 12 checks the number of matching candidates. In this case it is zero. If the candidate list is empty, the input control module 12 will not display the new input character at all. Therefore, the symbol "g" is not displayed. The input control module 12 checks the next symbol associated with the pressed key.

12. Steps 3 to 5 are repeated. The input string now changes to "ah". Again it has no candidates.

13. The input control module 12 checks the number of matching candidates. In this case it is zero. The input control module checks the next symbol associated with the pressed key.

14. Steps 3 to 5 are repeated. The input string now changes to "ai".

15. The steps 6 to 8 are repeated since "ai" is a valid input string.

Figure 7:
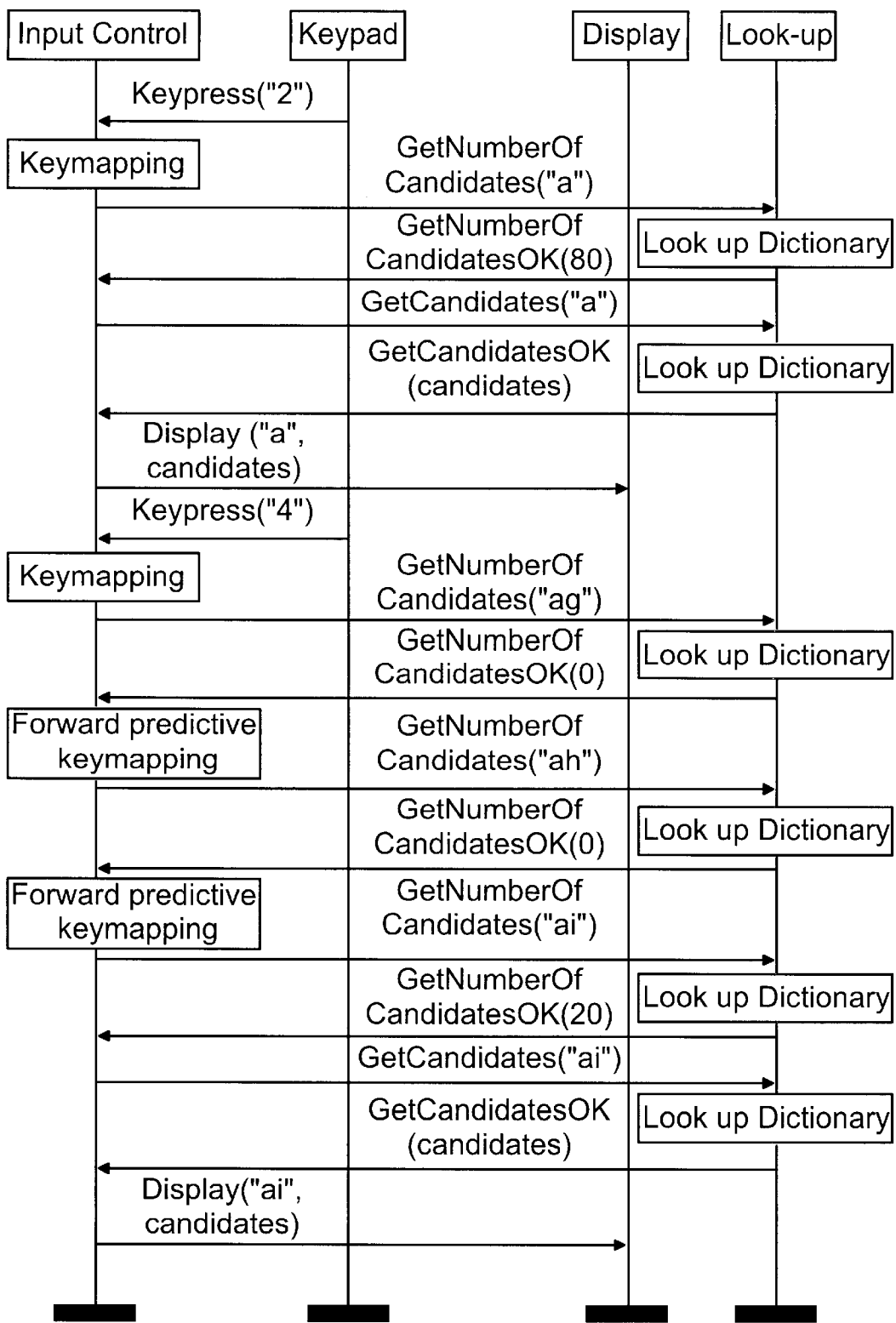
FIG. 7 shows a message sequence chart of forward predictive Chinese input.

These steps are shown in FIG. 7 in a message sequence chart of forward-predictive Chinese input. Of course, at the end of the sequence, one of the characters in the candidate window 26 is accepted as a valid input and is entered into the display.

The user control module 12 has knowledge of the keypad and symbols associated with various keys while the engine look-up module takes care of looking up the input string in the dictionary 20. The input control module 12 supplies the symbols of a pressed key in sequence to the engine look-up module 14, together with any previous input, until the engine returns a non-zero candidate number, that is it finds at least one match. Of course, if none of the symbols associated with the pressed key is valid, then the engine look-up module will continue to supply a zero candidate number. The input control module 12 controls the keypad input unit 16 and the display 18 so that appropriately limited alphabets are associated the keys of the keypad input unit 16 and are selectable.

As mentioned above in the description of the flowchart of FIG. 6, a Chinese character can be inputted even before the complete Pinyin string of that character is entered. For example, if a Chinese character with Pinyin string "gao" is to be inputted, it is possible for the user to scroll through the candidate in the candidate window 26 as soon as a valid Pinyin string has been inputted (even if it is only one character). Therefore, the user can find the character "gao" after inputting only "g" or "ga". Of course, such "partial input" will result in a longer candidate list and an increased IRCC. This feature is useful when the user does not remember the complete Pinyin string or is unable to input the whole string.

The table below shows the keystrokes required to input the Pinyin string "zhong" when using a method according to the invention.

| Keystroke | Symbol displayed | Comments |
|---|---|---|
| 9 | w | All w, x, y and z are permitted as first Pinyin symbols |
| 9 | X | |
| 9 | Y | |
| 9 | Z | z is entered after time-out. |
| 4 | h | h and i are permitted symbols. h is entered after time-out. |
| 6 | o | o is the only permitted symbol. o is entered after time-out. |
| 6 | n | n is the only permitted symbol. n is entered after time-out. |
| 4 | g | g is the only permitted symbol. g is entered after time-out. |

Using a keypad such as that shown in FIG. 2, then, in the absence of a predictive method, the keystrokes to enter the Pinyin string "zhong" would be "9999-44-666-time-out-66-4". However, using the predictive method according to the invention, the required keystrokes are "9999-4-6-time-out-6-4".

The table below presents statistics indicating the performance of the method according to the invention compared with a basic input method which does not use any predictive or statistical enhancement in symbol selection. In effect, the statistics show input efficiency of each of the methods. The statistics are based on 405 Pinyin strings which are used for a total of 7513 common Chinese characters. The table compares the average length of complete Pinyin strings for all the characters and the number of keystrokes which are needed to input these Pinyin strings by a conventional keypad using the basic input method and a method according to the invention. Assuming that an optimum method will require only one keystroke for each input of a symbol, the overhead of keypad input is also calculated.

| | Not weighted | Weighted by number of characters having the same pronunciation (in GB2312) |
|---|---|---|
| Average Pinyin length | 3.21 | 3.07 |
| Average number of keystrokes required without this invention | 6.68 | 6.47 |
| Average number of keystrokes required with this invention | 4.61 | 4.42 |
| Reduction of keystrokes required | 2.07 | 2.05 |
| Overhead number of keystrokes required without this invention | 3.47 | 3.40 |
| Overhead of number keystrokes required with this invention | 1.40 | 1.35 |
| Reduction of overhead (%) | 59.7 | 60.3 |
| Reduction of keystrokes (%) | 30.1 | 31.7 |

The weighting referred to above is calculated as follows. $L_p$ is the length of a Pinyin string given by the number of symbols in it. P is the total number of valid Pinyin strings, that is the size of the vocabulary space. For each Pinyin string, $N_p$ is the number of hanzi (Chinese characters) having the same Pinyin string. Therefore, the average Pinyin length is (Sum of $L_p$)/(Sum of valid Pinyin strings)=$\Sigma L_p/P$. The weighted average is calculated as (Sum of $N_p*L_p$)/(Total number of characters)=$\Sigma(N_p*L_p)/\Sigma N_p$. This weighted average provides that more weight is applied to Pinyin strings which match a greater number of characters when calculating the string length. The corresponding numbers of key strokes given above are weighted in the same way.

It can readily be seen that the invention reduces the average keystrokes for inputting a complete Pinyin string by more than two keystrokes. This is about 30% of the conventional input keystroke number. Furthermore, the stroke overhead is reduced by about 60%. It should be noted that these improvements are achieved without increasing the IRCC.

The invention is based on the fact that for many of the character input methods (particularly the Pinyin method) used to input Chinese characters, the input coding space is always a closed set with a limited number of codes. In other words, the input methods usually have their own vocabularies built by the basic input elements or symbols. These vocabularies always have their own patterns or characteristics.

The invention significantly simplifies the input of Pinyin into mobile handsets or other devices with small keypads where an alphabet of symbols is associated with a single key. With carefully designed key mapping, this method can also improve other Chinese input methods that have more than twelve input codes, such as Bopomofo or Wubizixin.

While preferred embodiments of the invention have been shown and described, it will be understood that such embodiments are described by way of example only. Numerous variations, changes and substitutions will occur to those skilled in the art without departing from the scope of the present invention. For example, although the invention has been described having only limited alphabets in order to provide more efficient input, in another embodiment there can also be provided an additional Chinese character level intelligence input method to improve the input method further. Different methods can be used to check that a particular symbol is valid as a subsequent choice. It can be done by checking the Chinese input dictionary as described in the embodiment above. Alternatively it can be done by rules based on linguistic knowledge. Although the invention has been described in relation to input of Chinese characters, it is not only limited to characters of that language. Although the term dictionary is used in the foregoing, it is to be understood that there may be a number of dictionaries provided for a number of different languages or different types of character input. In fact, the invention may be applied to input words in any language formed by using letters from, for example, the Latin alphabet. Such an embodiment would require a database of appropriate words and a means of checking that subsequent letters are valid for words which are under construction. Although the decision regarding the determination of which symbols are selectable from the keypad is stated as being made either by the engine look-up module or by the input control module, these modules may be integrated into a single functional unit. Accordingly, it is intended that the following claims cover all such, and other, variations as fall within the spirit and scope of the invention.

What is claimed is:

1. A method of inputting characters into a terminal the terminal having a display and at least a first symbol entry key and a second symbol entry key the first symbol entry key representing a first set of different symbols and the second symbol entry key representing a second set of different symbols in which use of the first symbol entry key to make a previous selection of a particular symbol from the first set of symbols is used to determine which of those symbols represented by the second symbol entry key is/are selectable in a subsequent selection wherein a character is input-able before a complete set of symbols corresponding to that character is selected.

2. A method according to claim 1 in which a number of the keys have associated with them an alphabet of different symbols which can be accessed and indicated in a display by means of single or multiple key selections of the keys.

3. A method according to claim 1 in which the previous selection results in the alphabet of symbols being limited for one or more of the keys.

4. A method according to claim 1 in which in response to key selection input a string of symbols comprising at least one symbol represented by the key is checked against a dictionary to determine if it is permitted.

5. A method according to claim 4 in which a look-up engine takes the key selection input and checks a string of symbols against the dictionary to check if the symbol string is permitted.

6. A method according to claim 5 in which the look-up engine takes the key selection input and constructs a first string of symbols using one of the symbols represented by the key and checks if the string of symbols is permitted and if it is not constructs further strings of symbols until strings of symbols have been constructed with all of the symbols represented by the key or until a permitted string of symbols is found.

7. A method according to claim 4 in which the symbol represented by the key is indicated in the display if the string of symbols is permitted.

8. A method according to claim 4 in which a user of the terminal can elect to enter the symbol into the display once it is indicated in the display.

9. A method according to claim 1 in which the symbols are selected from a group consisting of letters of the Latin alphabet, Arabic numerals, Bopomofo symbols, character strokes and tone marks.

10. A method according to claim 1 in which the characters are ideogram characters.

11. A method according to claim 1 in which the characters are Chinese characters.

12. A method according to claim 1 in which the characters are Japanese characters.

13. A method according to claim 1 in which the characters are Korean characters.

14. A method according to claim 1 in which the characters are words or phrases comprising an aggregation of symbols.

15. The method of claim 1, wherein the complete set of symbols comprises a complete string of symbols.

16. A terminal for receiving input of characters the terminal comprising a processor, and a user interface having a display and at least a first symbol entry key and a second symbol entry key the first symbol entry key representing a first set of different symbols and the second symbol entry key representing a second set of different symbols in which use of the first symbol entry key to make a previous selection of a particular symbol from the first set of symbols is used to determine which of those symbols represented by the second symbol entry key is/are selectable in a subsequent selection wherein a character is input-able before a complete set of symbols corresponding to that character is selected.

17. A terminal according to claim 16 which is a mobile terminal.

18. A terminal according to claim 17 which is selected from a group consisting of a mobile phone, a smart phone, a personal digital assistant, a laptop, an electronic notepad and a pager.

19. A terminal according to claim 18 in which the terminal is a cellular mobile phone for connection to a Cellular telephone network.

20. The terminal of claim 16, wherein the complete set of symbols comprises a complete string of symbols.

21. A user interface for inputting characters into a terminal the terminal having at least a first symbol entry key and a second symbol entry key the first symbol entry key representing a first set of different symbols and the second symbol entry key representing a second set of different symbols in which use of the first symbol entry key to make a previous selection of a particular symbol from the first set of symbols is used to determine which of those symbols represented by the second symbol entry key is/are selectable in a subsequent selection wherein a character is input-able before a complete set of symbols corresponding to that character is selected.

22. The user interface of claim 21, wherein the complete set of symbols comprises a complete string of symbols.

* * * * *